May 10, 1960

T. B. HEMSLEY 2,936,063

CONTINUOUS TROUGH CONVEYORS

Filed May 2, 1956

May 10, 1960  T. B. HEMSLEY  2,936,063
CONTINUOUS TROUGH CONVEYORS
Filed May 2, 1956  3 Sheets-Sheet 2

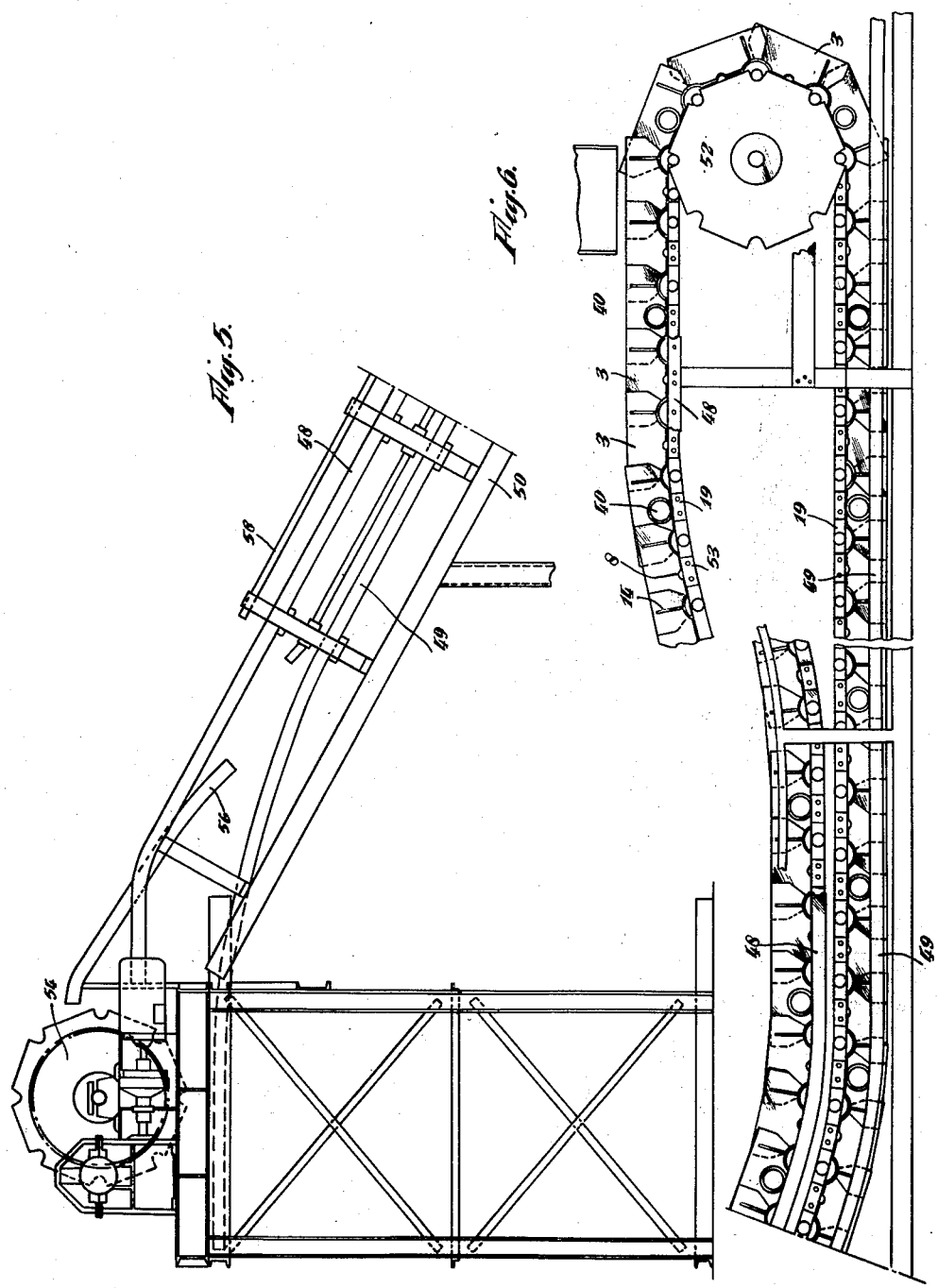

United States Patent Office 2,936,063
Patented May 10, 1960

2,936,063

CONTINUOUS TROUGH CONVEYORS

Thomas Bentham Hemsley, Newcastle-upon-Tyne, England, assignor of one-half to Clarke, Chapman & Company Limited, Gateshead, England, a British company Application May 2, 1956, Serial No. 582,140

Claims priority, application Great Britain May 5, 1955

2 Claims. (Cl. 198—196)

This invention relates to improvements in continuous trough conveyors.

A double strand continuous conveyor constructed in accordance with the present invention comprises at least a power transmission chain consisting of links, a plurality of trough elements each suspended between a pair of links, each trough element having an end portion slidingly overlapping or running over the adjacent end portion of the adjacent trough element and joined therewith to form an endless articulated trough, supporting rollers carried by some or all of said trough elements outboard thereof, and tracks for said rollers whereby the load in the trough is substantially carried by the rollers while the trough elements are conveyed by the power transmission chain.

In the preferred construction, the overlapping trough elements are supported on a double chain beneath said trough elements and supporting rollers are mounted on the side of every third trough element. Each trough element has bottom end portions of arcuate section forming transverse concavities adapted to overlap when the trough elements run around the sprockets. Each trough element may be transversed with a transverse flight.

Referring to the drawings filed herewith which illustrate an embodiment of the continuous trough conveyor made in accordance with this invention for conveying dry material having a very low angle of repose, such as cement clinker, from a horizontal surface and up an incline of 30 degrees:

Figures 5 and 6 are diagrammatic side elevations showing the upper and lower ends of a conveyor arranged for operating up an incline, the trough elements having been omitted from Figure 5 to show details which would otherwise be hidden.

Figure 1:
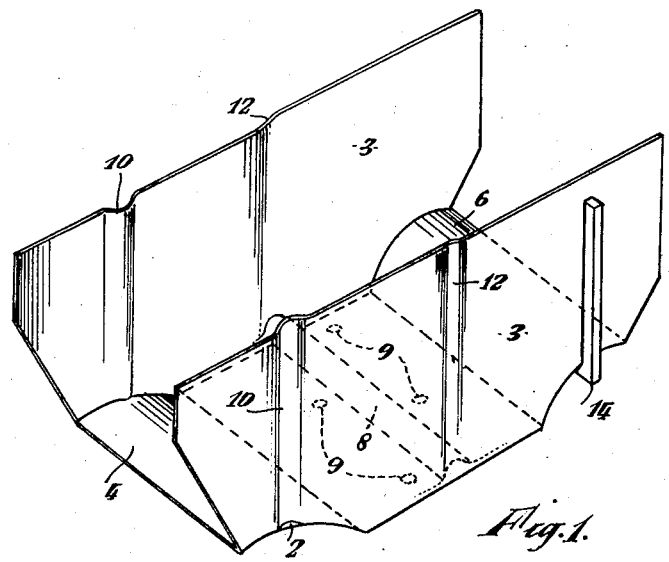
Figure 1 is a top perspective view of one of the conveyor trough elements partly in section to show the construction thereof.
Figure 2:
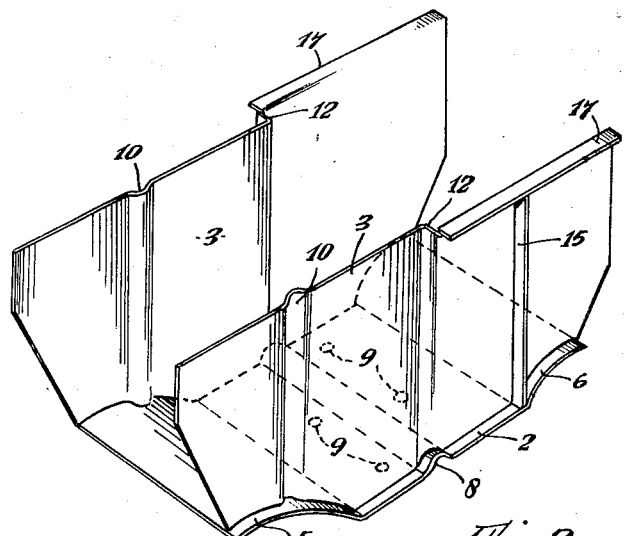
Figure 2 is a view similar to Figure 1 showing a modified trough element.

As will be seen from Figures 1 and 2, the trough elements each comprise a sheet steel floor 2 having side walls 3 welded thereto. Said floor has transversely arched arcuate leading and trailing end portions 4 and 6, the radius of curvature of the leading arcuate portion 4 being slightly larger than that of the trailing portion 6 so that leading and trailing end portions of adjacent trough elements slidingly fit together when the end portions are overlapped. The imaginary axes of the arcuate portions, as will be herein after described, correspond with the longitudinal axes of the rollers at the joint of the links of the chains which link the trough elements together.

A transverse arched strengthening rib 8 of smaller radius than the arcuate end portions is pressed up in approximately the center of the floor 2. The floor portion 2 is provided with four holes 9 to receive power chain transmission attachment bolts. The side walls 3 which are welded to the floor 2 along their shorter longitudinal edges slope outwardly and upwardly beyond the ends of the floor 2 and at the leading end of the trough they are each provided with an inwardly pressed vertical strengthening fold 10 extending from the top edge of the side wall down to the floor 2. Rearwardly of the fold 10 the side walls 3 are stepped outwardly at 12 so that at the trailing end the trough element is wider than at the leading end. When the elements are built up into a continuous trough conveyor the trailing end of each trough element overlaps outside the leading edge of the next element behind it. The vertical limb of an L-shaped stiffener member 14 is welded to the trailing end of each side wall 3 on the outside thereof with said limb not extending to the top of the side wall 3, the shorter limb being welded to the underside of the trailing arcuate portion 6 of the floor 2.

In the modified form of trough element shown in Figure 2, the floor is wider than the width of the trough and defines a ledge on either side of the trough element. The side walls 3 are cut away to follow the contour of the rib 8. Instead of the stiffener member 14 which extends partly under the floor 2 a stiffener member 15 is welded to the side wall 3 just at the inner edge of the arcuate end portion 6. Stiffener member 15 extends to the top of the side wall 3 and cooperates with a longitudinal strengthening member 17 which is welded to the top edge of the side wall 3 and extends from the step 12 to the trailing edge of the wall.

Figure 3:
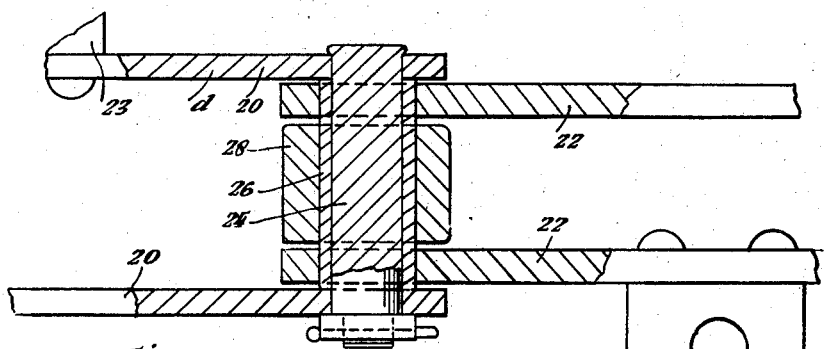
Figure 3 is a fragmentary section view showing the joint of the links of the chain.

The trough elements are linked together into a continuous trough conveyor with the side walls and floor portions of the elements overlapping so as to prevent any gaps in the trough. Thus the trough elements are linked together by a pair of parallel roller type power transmission chains carried beneath the troughs by trough brackets 23 (see Figure 3). The power transmission chains 18 and 19 each comprise pairs of inner and outer links 20 and 22, respectively, each pair of which is secured to one of the trough elements by angle brackets 23 which are arranged in staggered relation along the chains. The links 20 and 22 are connected together by pivot pins 24 secured in the outer links. The inner links are drilled to receive and be secured in spaced relation by a bushing 26, on which roller 28 is mounted. The angle brackets are on the outside of the links and arranged, as already stated, up and down the chains from each other, as shown in the drawings. Each angle bracket 23 has a link provided with two holes adjacent thereto and two corresponding holes in each limb for receiving the rivets. The rivets secure the brackets to the power transmission chains. Each angle bracket has a single hole for a bolt used to secure the other limb of the bracket to the trough element. The angle brackets 23 are dimensioned so that the axes of the rollers of the power transmission chains correspond with the imaginary axes of the arcuate portions 4 and 6 of the floor 2 of the trough elements.

Figure 4:
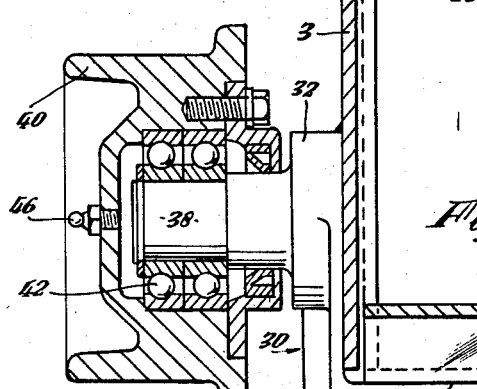
Figure 4 is a fragmentary transverse section through one side of a trough element showing the construction and mounting of one of the supporting rollers.

Referring now to Figures 4 and 6, it will be seen that roller brackets are welded to the sides of every third trough unit. Brackets 30 have a boss 32 from which leg members 34 extend downwardly. Each leg member 34 has a foot member 36 at right angles thereto which extends under the floor 2. An axle 38 is secured in the boss 30 and carries a roller 40 mounted thereon in ball bearings 42. Axle 38 extends coaxially with the boss 32 in the opposite direction to the foot member 36. The roller 40 is provided with a flange 44 on its inner edge and its outer face is hollowed out to provide protection for a grease nipple 46 which is disposed so as to be coaxial with the bracket axles 38. The bracket is mounted substantially centrally of the trough elements with the foot member 36 welded to the underside of the floor 2 and the leg member 34 vertical and welded to the side 3.

As will be seen from Figures 5 and 6 the rollers 40 run on two pairs of parallel rails 48 and 49 respectively supported on a frame 50. The top pair of rails 48 starts just beyond the top of the tail sprockets 52 ending below the axis of said sprocket. The lower pair of rails 49 begin below the head sprockets 54 and run parallel to but below the top pair 48 ending below the tail sprockets 52. Guide rails 56 are provided at the head and tail sprockets to guide the chain rollers onto and off the sprockets.

The conveyor trough elements are thus linked together into a single unbroken or continuous trough conveyor even where the conveyor passes around the head and tail sprockets. The weight of the conveyor and its load however are carried by the rollers on the trough elements and thus any distortion of the trough elements by the load is substantially separated from the power transmission chain so that it does not distort said chain. Moreover the chains which are most vulnerable and difficult to lubricate are protected from the grit of the load or any spillage over the sides of the trough as a result of their being positioned under the trough. The rollers which are mounted in ball bearings are less vulnerable, easily lubricated and readily replaceable.

The tail end sprocket wheels 52 of the conveyor are adjustable in the frame 50, in well known manner, so that the conveyor chains 18 and 19 can be tensioned to adjust the slight catenary which occurs between successive external supporting rollers 40.

As the weight of our improved trough conveyor and its load is wholly carried by the external rollers 40 which run on ball bearings, the power required to travel the conveyor is low. In the embodiment above described, the trough elements have a high capacity which, combined with a conveying speed of 90 feet per minute, enables up to 400 tons per hour to be conveyed up a slope of 30 degrees. This conveyor is suitable for conveying any type of loose material and capable of running for long periods with low maintainance costs. Further this conveyor is suitable for conveying loose material having a low angle of repose up a slope of substantially 30 degrees without requiring the addition of flights or equivalent devices and with little or no spillage. Over level ground it is capable of extending for two thousand yards. Also the change from the horizontal plane up to a slope of 30 degrees can be effected in as little as 20 feet.

Figure 7:
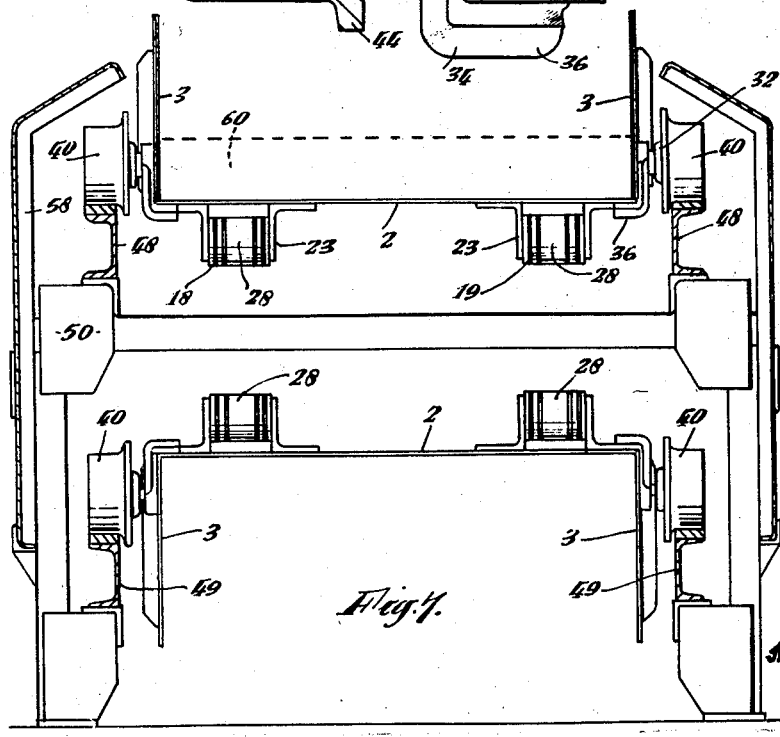
Figure 7 is a section through the conveyor on the line VII—VII of Figure 6.

Should it be desired to convey dry loose material up a slope steeper than 30 degrees, then flights 60, shown dotted in Figure 7, may be fitted in obvious manner.

Drop-in guard plates 58 are provided on each side of the trough elements for the full length of the trough conveyor and they are so arranged that no bolts are required for fixing them in place.

Having thus described the invention, what is claimed is:

1. In a continuous trough conveyor, an endless power transmission chain having a plurality of links; sprockets about which said endless chain is displaceable; brackets carried by the links of the chain; trough elements each of which is rigidly connected to one of said brackets to transmit power from the chain to the trough elements; each of said trough elements having a bottom and side walls welded thereto, said bottom being provided with a transversely arched arcuate leading end portion and a transversely arched arcuate trailing end portion having a radius of curvature less than that of the transversely arched arcuate leading end portion and said side walls sloping outwardly and upwardly beyond the ends of the bottom and being provided with an inwardly pressed vertical fold near the leading end portion and an outward step rearwardly of the vertical fold, whereby the trailing end of the element is wider than the leading end, said trough element being adapted slidingly to overlap a preceding and a succeeding trough element of the same construction both at its bottom and at its sidewalls; further brackets mounted on certain of said elements; a number of rollers each carried by one of said further brackets at the side of the trough element at which the relative further bracket is located and rails positioned to engage said rollers; the said trough construction and arrangement providing a continuous trough floor maintainable during flexion of said trough both in a first direction when the chain is passing around the sprockets and in the opposite direction when lengths of the chain hang in a substantially catenary curve between successive pairs of rail-supported rollers.

2. In a continuous trough conveyor as claimed in claim 1, a number of stub-axles each accommodated in one of said further brackets; ball bearings, whereby each roller is supported by the stub-axle corresponding thereto; and a lubricating nipple for each bearing accommodated in a recess in the end-face of the roller supported by the bearing.

References Cited in the file of this patent

UNITED STATES PATENTS

| | | |
|---|---|---|
| 212,317 | Mey | Feb. 18, 1879 |
| 551,509 | Paul | Dec. 17, 1895 |
| 1,672,730 | Proctor | June 5, 1928 |
| 1,804,423 | Krenzke | May 12, 1931 |
| 1,854,334 | Jensen et al. | Apr. 19, 1932 |

FOREIGN PATENTS

| | | |
|---|---|---|
| 9,632 | Great Britain | May 15, 1895 |
| 1,069,335 | France | Feb. 10, 1954 |